(No Model.)
L. B. FLEMING.
WHEEL CLEANER.
No. 531,171. Patented Dec. 18, 1894.
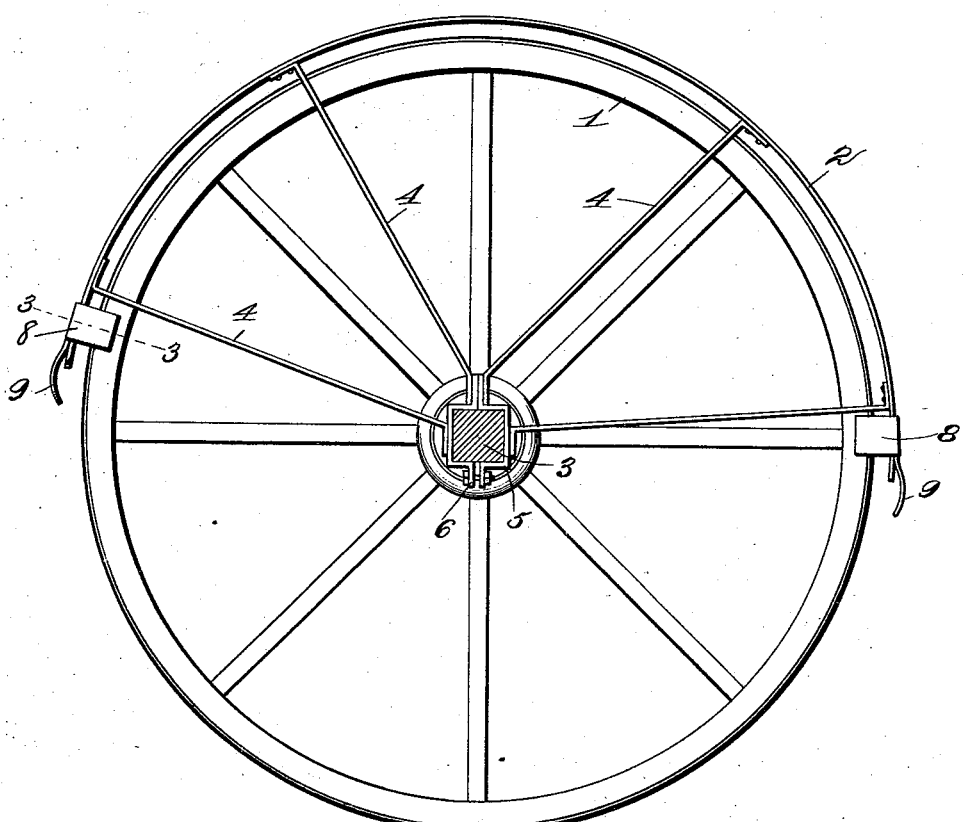
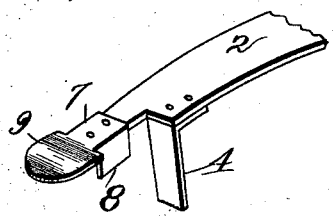
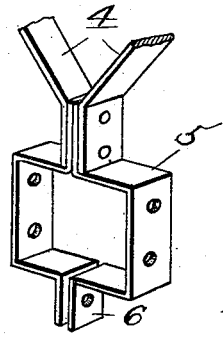
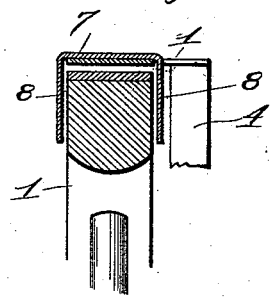
Attest
M. Smith
C. A. Blankenmeister
Inventor
Lizzie B. Fleming
By Higdon & Higdon & Longan
Att'ys

UNITED STATES PATENT OFFICE.

LIZZIE B. FLEMING, OF PIERCE CITY, MISSOURI.

WHEEL-CLEANER.

SPECIFICATION forming part of Letters Patent No. 531,171, dated December 18, 1894.

Application filed March 22, 1894. Serial No. 504,730. (No model.)

*To all whom it may concern:*

Be it known that I, LIZZIE B. FLEMING, of Pierce City, county of Lawrence, State of Missouri, have invented certain new and useful Improvements in Wheel-Cleaners, of which the following is a full, clear, and exact description, reference being had to the accompanying drawings, forming a part hereof.

My invention relates to an improved wheel-cleaner, and consists in the novel construction, combination and arrangement of parts hereinafter described and designated in the claim, and illustrated in the accompanying drawings.

The object of my invention is to construct a device for keeping vehicle wheels free of dirt.

A further object of my invention is to construct a device that will be cheap in construction, durable and that can be readily applied to a vehicle for keeping the wheels thereof free from dirt.

In the drawings: Figure 1 is a side elevation of a vehicle wheel, showing my improved cleaner applied thereto in the position ready for use. Fig. 2 is a detail view in perspective of a portion of the cleaner, the same being detached from the wheel. Fig. 3 is a transverse sectional view of the felly and the cleaner, said section being taken on the line 3—3 of Fig. 1. Fig. 4 is an enlarged detail view in perspective of a clasp which is made use of in carrying out my invention.

The numeral 1 indicates a wheel, which may be of any ordinary construction, but as here shown is a vehicle wheel, as my improved cleaner is especially adapted for wheels of that class.

2 indicates a rim, which, besides holding the cleaners, acts as a mud-guard for the wheel. This rim or mud-guard is connected to the axle 3 of the vehicle by arms 4, one end of said arms being connected to the rim or mud-guard, and the other end connected to a clasp 5. This clasp is so constructed that it can be attached to or detached from the axle of the vehicle. This clasp is constructed with two downwardly pending perforated ears or projections 6, through which a bolt can pass, said bolt being constructed with a nut so that by screwing the nut on the bolt, it will draw said perforated ears or projections together, and cause the sides of the clasp to adhere to the axle.

The rim 2 is so formed that its ends will almost come in contact with the tire of the wheel, so that when the wheel is rotated, they will scrape the dirt off of the tire.

The rim 2 is somewhat wider than the wheel, so that it will make a perfect mud-guard and also allow the arms 4 to be connected to the edge thereof without interfering with the wheel as it rotates.

The rim 2 is narrower at each end than the body of said rim, and the narrow portion is about the same width as the tire.

7 indicates the device which cleans the edges of the tire and the sides of the felly. This device is constructed of a single piece of flat metal, and is provided with two flanges 8 of such a size that they project over the edges of the tire and felly, and they are in juxtaposition with said tire and felly, so that they will scrape the dirt off of the edges of the wheel as it rotates between said flanges.

Formed on the device 7 is a projection 9, which extends out over the free end of the rim 2, and the free end of said projection will come in contact with the dirt as it is carried by the wheel before it reaches the adjacent end of the rim 2, and scrape a portion of the dirt off of the wheel.

It will be observed by inspecting Fig. 1 that the rim is lower on one edge of the wheel than on the other, thus making a more complete mud-guard.

What I claim is—

In a wheel cleaning device, a rim having suitable supports, each end being in juxtaposition with the tire of the wheel, and a device having flanges which project over the edges of the wheel connected to each end of said rim, substantially as set forth.

In testimony whereof I affix my signature in presence of two witnesses.

LIZZIE B. FLEMING.

Witnesses:
ED. H. FLEMING,
FRANCES JULIET BURROW.